3,279,885
PROCESS OF PREPARING AMMONIUM
DICYANAMIDE
James W. Sprague, Streetsboro, and Harry A. Adams,
Bedford Heights, Ohio, assignors to The Standard Oil
Company, Cleveland, Ohio, a corporation of Ohio
No Drawing. Filed July 18, 1963, Ser. No. 296,887
6 Claims. (Cl. 23—190)

This invention relates to a process for the preparation of ammonium dicyanamide, and to methods of producing dicyandiamide and melamine from ammonium dicyanamide.

Heretofore, ammonium dicyanamide, although known, has attracted little commercial interest, primarily because it has been very difficult to obtain, by any convenient method, in the pure form. For example, Madelung et al. in Annalen der Chemie, 427, pages 1–26 (1922), disclose that ammonium dicyanamide can be prepared by reacting the ammonia complex of copper dicyanamide with hydrogen sulfide, thereafter separating out sulfur and copper sulfide, and recrystallizing ammonium dicyanamide from the solution. However, the ammonium dicyanamide so prepared is quite impure, and a series of recrystallizations are required to purify it sufficiently to be of any value. In addition, the ammonia complex of copper dicyanamide is not readily available, and hence would have to be specially prepared.

In accordance with this invention, good yields of pure ammonium dicyanamide are obtained by reacting a cyanogen halide in a concentrated solution with ammonia in an inert solvent at a pressure sufficient to maintain the ammonia in the liquid phase and at a temperature within the range of −50 to 80° C.

The reaction that takes place is as follows, where X is a halide atom:

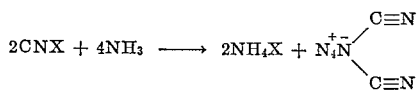

Good yields of substantially pure ammonium dicyanamide are obtained if the solvent employed has a good solubility for the cyanogen halide but a low solubility for the ammonium halide by-product under the reaction conditions, to prevent side reactions involving ammonium halide, such as guanidine formation. The solvent should also have a low solubility for the ammonium dicyanamide product but not necessarily under the reaction conditions, since low solubility merely facilitates separation of the product from the solution. The solvents which can be used in this reaction are capable of dissolving at least 250 grams of cyanogen halide per liter, and not in excess of about 5 grams and preferably less than 1 gram of ammonium halide per liter, and preferably have a boiling point between about 50° and 250° C. Preferably, ammonia is also soluble in the solvent at reaction temperatures. The solvent of course should also be inert under the reaction conditions.

Suitable solvents include cyclic ethers, polyoxyalkylene ethers, sulfones, and especially the sulfolanes, five-membered ring compounds containing the group

in the ring, and having from four to twelve carbon atoms.

There is no criticality in molecular weight, except that the solvent should, of course, be a liquid preferably at room temperature and certainly at reaction temperature, and should have a sufficiently low boiling point to permit its separation from the solid reaction product at the conclusion of the process.

Polyoxyalkylene and cyclic ethers best meet the above requirements, and of these, tetrahydrofuran, 1,2-dimethoxyethane (dimethyl ethylene glycol) and 1,4-dioxane are preferred. Dimethyl-triethylene glycol, dibutoxy diethylene glycol, dimethyl diethylene glycol, dibutyl triethylene glycol, dimethyl tetraethylene glycol and diethyl diethylene glycol are additional exemplary polyoxyalkylene ethers. The polyoxyalkylene ethers have at least two ether groups linked by an alkylene group and terminal alkyl groups are attached to the first and last ether groups in the chain. The ether should not have an appreciable hydrocarbon character, and it is therefore important that there be a large proportion of ether groups to carbon atoms, preferably at least one ether oxygen for each five carbon atoms.

The cyclic ethers are ring compounds having the ether oxygen in the ring, which is composed of oxygen and carbon atoms. The ring will contain at least one and preferably two ether oxygens, and at least one ether oxygen for each five carbon atoms. 1,3-dioxane, and tetrahydropyran are additional examples of cyclic ethers.

The sulfolanes are ring compounds having the general structure:

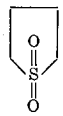

The first member of the series is sulfolane, thiophan sulfone. Additional examples are dimethyl sulfolane, methyl sulfolane, and dibutyl sulfolane.

The process is applicable to any cyanogen halide, including cyanogen bromide, cyanogen chloride, cyanogen iodide and cyanogen fluoride, but cyanogen bromide and cyanogen chloride are preferred because they are easier to prepare and handle.

The reaction mixture should contain a slight excess of ammonia. Hence, the ammonia:cyanogen halide ratio should be at least 2:1. Ratios in excess of about 2.5:1 lead to undesirably large amounts of residual halide in the solution, and accordingly the preferred range of ratios is from 2:1 to 2.5:1.

During the reaction, the ammonia must be maintained in the liquid phase. This is conveniently ensured by using liquid ammonia as a starting reactant, and maintaining a sufficient reaction pressure to keep the ammonia in the liquid phase. Alternatively, the reaction can be carried out at atmospheric pressure but at temperatures sufficiently low to maintain the ammonia in the liquid state. As a further alternative, ammonia gas can be added to the reactor, and then pressure employed to liquefy the ammonia.

If, in performing the reaction, the full amount of one or the other of the two starting reactants is added to the reactor, and the other is then gradually added at a rate sufficient to prevent an undue temperature rise, since the reaction is exothermic, the formation of ammonium dicyanamide is favored. Hence it is preferred that this reaction be performed as a batch reaction. However, a blending of the reactants can also result in an effective reaction and good yields.

Optimum yields are obtained at atmospheric pressure at reaction temperatures of from about −40° C. to about −30° C., although temperatures within the range from about −50° to 0° C. can be employed at atmospheric pressure. The reaction time for optimum yields will generally be within the range of ¼ to 3 hours.

The concentration of the cyanogen halide solution is quite important. The solution should contain at least about 200 grams of cyanogen halide per liter, and preferably at least 250 grams. The upper limit of concentration is determined solely by the solubility of the cyanogen halide in the particular solvent employed and is not otherwise critical.

If less concentrated solutions of cyanogen halides are employed, substantially no ammonium dicyanamide will be formed. Instead the reaction that takes place will be $$2NH_3 + CNX \rightarrow N\equiv C-NH_2 + NH_4X$$

Cyanamide is also formed in solution when higher concentrations of cyanogen halides are employed, but, at the higher concentrations of cyanogen halide, appreciable quantities of ammonium dicyanamide are also formed.

The reaction system should be provided with a means for carrying off the heat liberated, such as refluxing beneath a condenser, or by cooling coils inserted within the reaction vessel, or by a cooling jacket enclosing the reaction vessel.

The refluxing temperature can be lowered, if the solvent has a higher boiling point than the desired reaction temperature, by including a small amount of a compatible inert lower boiling liquid, such as isopentane, pentane and dimethyl ether.

As the reaction proceeds, insoluble materials, such as ammonium halide, and also ammonium dicyanamide, depending on the solvent, will separate out. Hence, it may be desirable to agitate the system to maintain uniformity. After reaction is completed, the supernatant liquor is separated from the precipitated solids, such as by filtration, decantation or centrifugation. The solvent, unprecipitated product and any other by products of the reaction can be recovered by fractionally distilling the solution. Thereafter, the solids are treated with a solvent for ammonium dicyanamide in which ammonium halide is substantially insoluble. The ammonium dicyanamide is thereafter obtained by crystallization from the solvent in a substantially pure form, suitable for further use, without the necessity for recrystallization. Suitable solvents for use in the separation step include: lower alkyl esters such as methyl acetate, ethyl acetate and the like and lower alkyl ketones such as acetone, methyl ethyl ketone, diethyl ketone and the like.

Ammonium dicyanamide is a useful intermediate in the preparation of many organic chemicals. For example, if ammonium dicyanamide is heated to just above its melting point and maintained there for several minutes, usually from 5 to 10 minutes, it will first melt and then resolidify in the form of dicyanamide. The equation for this reaction is:

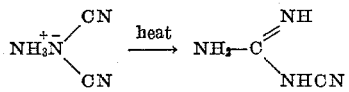

Generally, to form dicyandiamide from ammonium dicyanamide, solid ammonium dicyanamide should be heated for from about 2 to about 15 minutes at a temperature from about 135 to about 150° C.

Ammonium dicyanamide can also be converted to melamine, in accordance with the following equation:

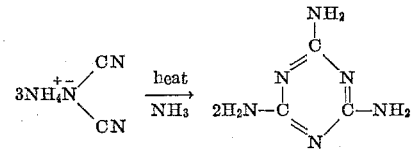

Melamine is prepared by heating ammonium dicyanamide, either in the pure form or while suspended in an inert fluid or dissolved in a suitable inert solvent, in the presence of ammonia, at a temperature of from about 350 to 425° C. for a sufficient time to complete the reaction to melamine, generally from about 1 to 10 hours. A pressure of ammonia in the reactor of from about 800 to 3000 p.s.i. is preferable. Neither the solvent or suspending fluid nor the ammonia take part in the reaction. The solvent or suspending fluid, if any, merely serves to aid in heat transfer since uniform, slow heating is preferred for product purity. The ammonia serves as a catalyst to direct the reaction toward the formation of melamine.

If the ammonium dicyanamide is to be suspended in a fluid, any fluid in which melamine is also insoluble can be used, provided it has a sufficiently high boiling point to remain in the liquid phase during the reaction. Means should be provided for maintaining the particles in suspension, as by equipping the reactor with an agitating device. At the conclusion of the reaction, when agitation ceases, the solid material separated from the suspension will be substantially pure melamine. Representative suspending fluids include dioxane and tetrahydrofuran.

The following example represents, in the opinion of the inventors, the best mode of carrying out their invention.

*Example*

150 ml. of a concentrated solution of cyanogen bromide in 1,2-dimethoxyethane, containing 100 grams of cyanogen bromide, was added to 250 ml. of liquid ammonia maintained at atmospheric pressure in a reactor equipped with a condenser which was cooled with a Dry Ice-acetone mixture. The reaction mixture was allowed to warm to room temperature under agitation, and thereafter the excess ammonia was allowed to escape by shutting off the supply of coolant to the condenser. After the ammonia was removed and agitation was stopped, a solid material was observed to separate from the solution. The solution was decanted therefrom and discarded. The solids were extracted with 200 ml. of ethyl acetate, which was evaporated to a volume of 50 ml. and cooled, to permit crystallization to occur. The remaining solids were reextracted with 200 ml. of acetone, and also concentrated to a volume of 50 ml. and cooled, to permit crystallization to occur. The crystallized solids were separated from the respective solutions by filtration, combined, washed with a small portion of acetone and recrystallized from hot acetone, yielding white crystals, having a melting point of 139–140° C., identified as ammonium dicyanamide.

Analysis: 29.6% carbon, 5.4% hydrogen, and 64.2% nitrogen. Calculated for ammonium dicyanamide: 28.6% carbon, 4.8% hydrogen and 66.6% nitrogen. The infrared spectrum of the product showed the presence of the nitrile group and the ammonium ion. The nuclear magnetic resonance spectrum showed only hydrogen associated with nitrogen, thereby confirming that the product was ammonium dicyanamide.

The ammonium dicyanamide thus prepared was heated in an open reactor at 295° F. for 15 minutes, whereupon it melted, and then resolidified to yield a product identified by infrared spectra comparison with the known material as pure dicyandiamide.

Ten grams of ammonium dicyandiamide, prepared as above, was added to an autoclave. Thereafter, 10 grams of ammonia was added to the autoclave, which was then sealed. The temperature in the autoclave was raised to 350° F. over the course of two hours, and maintained at this temperature for an additional two hours. The ammonia was released, and recovered, and a white powder was observed to be contained in the autoclave. This white powder was found to be melamine, having a purity of 95%.

We claim:

1. A method of preparing ammonium dicyanamide comprising reacting ammonia with cyanogen halide, in solution in an inert solvent at a concentration of at least about 200 grams of cyanogen halide per liter, at a temperature and a pressure sufficient to maintain the ammonia in the liquid phase, for a time and at a temperature sufficient to favor the formation of ammonium dicyanamide, and recovering ammonium dicyanamide from the reaction mixture.

2. A method as in claim 1 wherein the cyanogen halide is selected from the group consisting of cyanogen bromide and cyanogen chloride.

3. A method as in claim 1 wherein the cyanogen halide solution is a solution of cyanogen halide in a solvent for cyanogen halide in which ammonium halide is substantially insoluble.

4. A method as in claim 3 wherein the solvent is selected from the group consisting of sulfolanes having from four to twelve carbon atoms, cyclic ethers containing at least one ether oxygen for each five carbon atoms, polyoxyalkylene ethers having at least two ether groups linked by an alkylene group and having at least one ether oxygen for each five carbon atoms.

5. A method as in claim 3 wherein the solvent is selected from the group consisting of tetrahydrofuran, 1,4-dioxane and 1,2-dimethoxyethane.

6. A method as in claim 1 in which the ammonium dicyanamide is separated from the ammonium halide formed during the reaction.

References Cited by the Examiner

UNITED STATES PATENTS

| | | | |
|---|---|---|---|
| 1,618,504 | 2/1927 | Barsky | 23—190 |
| 2,416,545 | 2/1947 | Osborne | 23—190 |
| 2,492,821 | 12/1949 | Studeny et al. | 117—154 |
| 2,562,869 | 7/1951 | Nagy | 23—78 |
| 2,732,277 | 1/1956 | Gleissner et al. | 8—94.14 |
| 2,824,104 | 2/1958 | Robinson et al. | 260—249.7 |
| 2,918,467 | 12/1959 | Hibbitts et al. | 260—249.7 |
| 3,052,517 | 9/1962 | Gilbert | 23—78 |

OSCAR R. VERTIZ, *Primary Examiner.*

NICHOLAS S. RIZZO, M. W. WESTERN, J. J. BROWN,
*Assistant Examiners.*